(12) United States Patent
Olsson

(10) Patent No.: US 7,953,543 B2
(45) Date of Patent: May 31, 2011

(54) DEVICE AND METHOD FOR COMMUNICATION BETWEEN A CONTROL SYSTEM FOR SMALL INTERNAL COMBUSTION ENGINES AND AN EXTERNAL COMPUTER

(75) Inventor: Johan Olsson, Åmål (SE)

(73) Assignee: SEM Aktiebolag, Amal (SE)

( * ) Notice: Subject to any disclaimer, the term of this patent is extended or adjusted under 35 U.S.C. 154(b) by 828 days.

(21) Appl. No.: 11/817,064

(22) PCT Filed: Mar. 28, 2006

(86) PCT No.: PCT/SE2006/050044
§ 371 (c)(1),
(2), (4) Date: Aug. 24, 2007

(87) PCT Pub. No.: WO2006/104456
PCT Pub. Date: Oct. 5, 2006

(65) Prior Publication Data
US 2008/0262706 A1     Oct. 23, 2008

(30) Foreign Application Priority Data
Mar. 29, 2005     (SE) ...................................... 0500697

(51) Int. Cl.
*F02D 13/06* (2006.01)
*G06F 19/00* (2011.01)

(52) U.S. Cl. ...... 701/112; 701/115; 701/116; 123/198 F

(58) Field of Classification Search ............ 340/310.16; 310/359; 123/198 F, 179.1, 179.4, 179.26, 123/490, 299, 533, 456, 516, 491, 305, 352, 123/179.16, 179.17; 290/38 R, 48, 1 A, 1 B; 320/103, 114, 138; 701/101, 102, 103, 104, 105, 112, 115, 116; G06F 19/00; F02D 13/06
See application file for complete search history.

(56) References Cited

U.S. PATENT DOCUMENTS

| | | | | |
|---|---|---|---|---|
| 3,186,218 | A * | 6/1965 | Hollis | 73/114.13 |
| 4,870,585 | A * | 9/1989 | Manzolini | 701/101 |
| 5,924,405 | A * | 7/1999 | Hashimoto | 123/431 |
| 6,085,142 | A | 7/2000 | Di Leo | |
| 6,549,843 | B1 * | 4/2003 | Koerner | 701/104 |
| 6,962,513 | B2 * | 11/2005 | Kimata et al. | 440/2 |
| 2003/0082963 | A1 * | 5/2003 | Motose et al. | 440/2 |
| 2004/0130442 | A1 * | 7/2004 | Breed et al. | 340/443 |

FOREIGN PATENT DOCUMENTS
DE  19614462 A1   10/1997
WO  9209957 A1    6/1992

* cited by examiner

*Primary Examiner* — Michael Cuff
*Assistant Examiner* — Keith Coleman
(74) *Attorney, Agent, or Firm* — Jeffrey S. Melcher; Manelli Denison & Selter PLLC

(57) ABSTRACT

By incorporating digital control systems for ignition of, and to some extent for fuel injection in, small internal combustion engines, opportunities have been created for the connection of external computers, in order thereby to be able to change the characteristics of the control system, as well as to be able to read operational data from the same. The operational data may be e.g. operating time and trip meter. The method according to the invention means that a combined communication port and stop entry is created, which will result in a cost-effective implementation of the communication interface when a stop entry with an associated transient protection already exists.

17 Claims, 4 Drawing Sheets

Figure 1:
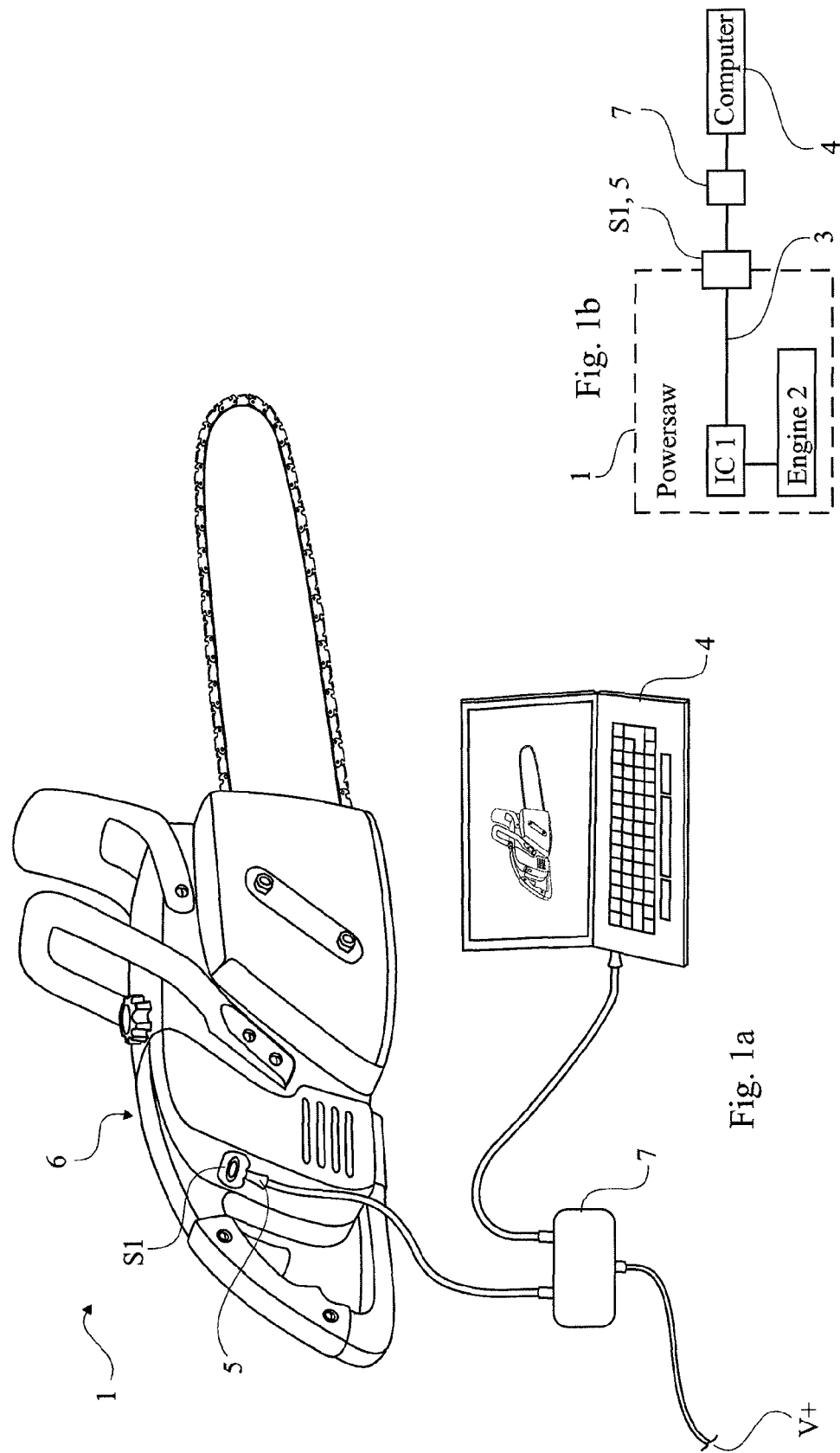

DEVICE AND METHOD FOR COMMUNICATION BETWEEN A CONTROL SYSTEM FOR SMALL INTERNAL COMBUSTION ENGINES AND AN EXTERNAL COMPUTER

CROSS-REFERENCE TO RELATED APPLICATIONS

This application is a national stage entry under 35 U.S.C. 371 of International Application No. PCT/SE2006/50044, filed 28 Mar. 2006 designating the United States. This application claims foreign priority under 35 U.S.C. 119 and 365 to Swedish Patent Application No. 0500697-8, filed 29 Mar. 2005.

The present invention relates to a tool with an internal combustion engine, which tool is intended for manual starting, without a starter battery, and which tool comprises an electronic control circuit to control the internal combustion engine and a stop button to stop said internal combustion engine, a connection being arranged between the stop button and said electronic control circuit.

TECHNICAL BACKGROUND

By incorporating digital control systems for ignition of, and to some extent for fuel injection in, small internal combustion engines, opportunities have been created for the connection of external computers, in order thereby to be able to change the characteristics of the control system, as well as to be able to read operational data from the same. The implementation of a communication with an external computer is however associated with a number of restrictions, of which a low production cost and a high reliability are the most important ones. Such restrictions create problems in using communication solutions of today.

U.S. Pat. No. 5,210,846 discloses a one-wire bus for two-way communication. The basic principle of this two-way one-wire bus is good, but for technical reasons it is in practice inapplicable for internal combustion engines. This is because in this application, the described one-wire must be able to transfer power for feeding the control system during communication, and also the interface must include an extremely effective protection against voltage transients, since it is in the nature of an ignition system that it includes risks of unwanted discharges.

U.S. Pat. No. 6,549,843 discloses an internal combustion engine that may be used in an outboard engine, having an associated control unit. A general service computer can be coupled to ECU via a serial cable on the electronic control unit.

BRIEF ACCOUNT OF THE INVENTION

The present invention relates to a tool with an internal combustion engine, which tool is intended for manual starting, without a starter battery, and which tool comprises an electronic control circuit to control the internal combustion engine and a stop button to stop said internal combustion engine, a connection being arranged between the stop button and said electronic control circuit, said connection between the stop button and the control circuit being adapted to be used for data communications between the control circuit and an external computer. This gives the advantage that the number of components can be kept down, thanks to the connection being shared, whereby the production costs can be kept down by using the outer conductor existing on all control systems for small internal combustion engines, that is, the stop button entry. Accordingly, the physical entry already exists, and is provided with a protection against incoming voltage transients, which is beneficial since it is in the nature of an ignition system that it includes risks of unwanted discharges.

According to additional aspects of the invention:
said connection between the stop button and the control circuit is arranged to be used for external voltage supply to said electronic control circuit, and preferably also to other electronic components connected to said connection, which gives the advantage that the control unit and other components of the ignition system can be given power also when the engine is not running.
a capacitor is charged by said external voltage supply, and said capacitor supplies power to the electronic control circuit in the absence of external voltage supply via the connection or voltage supply from the engine, which gives the advantage that the control circuit receives voltage supply in the absence of an external voltage supply and voltage supply from the engine.
an outer contact, connected to said connection, is arranged at the casing of said tool, which gives the advantage that it is easy to connect a data communications cable to the tool.
said connection comprises a low-pass filter arranged between the electronic control circuit and the stop button, which has the advantage of acting as a protection against voltage transients.
said connection comprises a one-wire bus for two-way data communications.
a communication interface, preferably in the form of a separate unit, is arranged between said connection and the external computer, said communication interface preferably converting a one-wire communication from the tool to a conventional interface such as RS-232, which gives the advantage that a conventional computer may communicate with the control unit.

The present invention also provides a method for data communications between an electronic control circuit and an internal combustion engine intended for manual starting without a starter battery, as well as an external computer, an outer stop button being arranged to be in connection with the electronic control circuit, and the connection being used for said data communications.

According to additional aspects of the method:
said connection between the stop button and the electronic control circuit, is used for current supply to the electronic control circuit and to other components connected to said connection.
the data communications take place from the external computer, to the electronic control circuit.
the data communications take place from the control circuit, to the external computer.
the data communications take place serially.

Additional advantages of the invention are clear from the following description.

SHORT DESCRIPTION OF THE DRAWINGS

Figure 2:
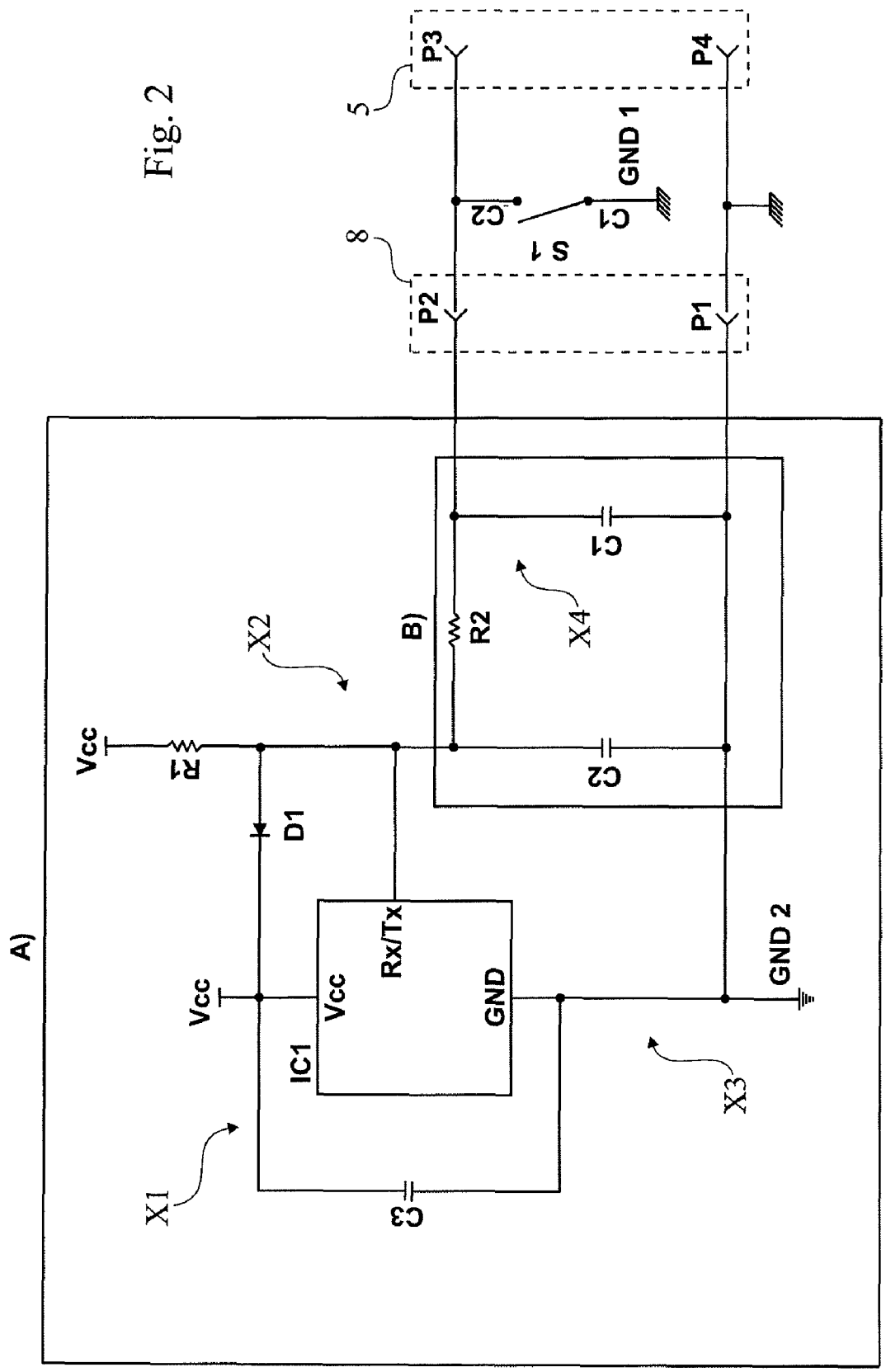
Figure 3:
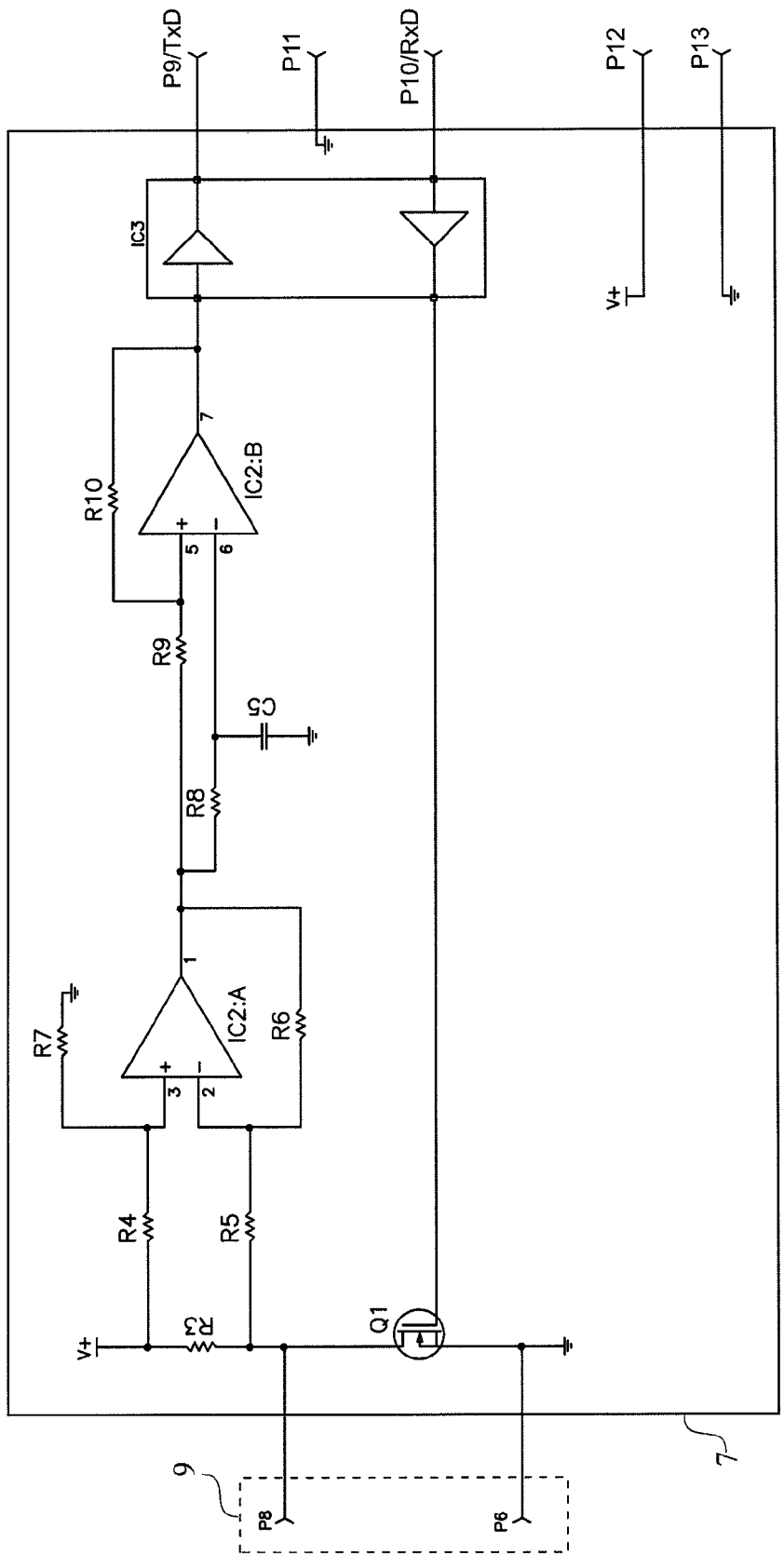
Figure 4:
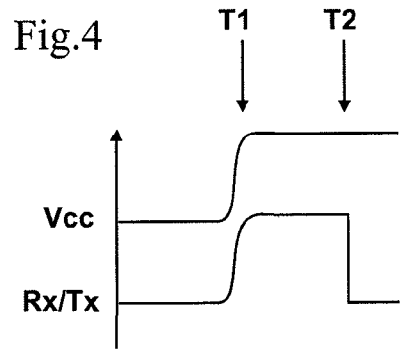
Figure 5:
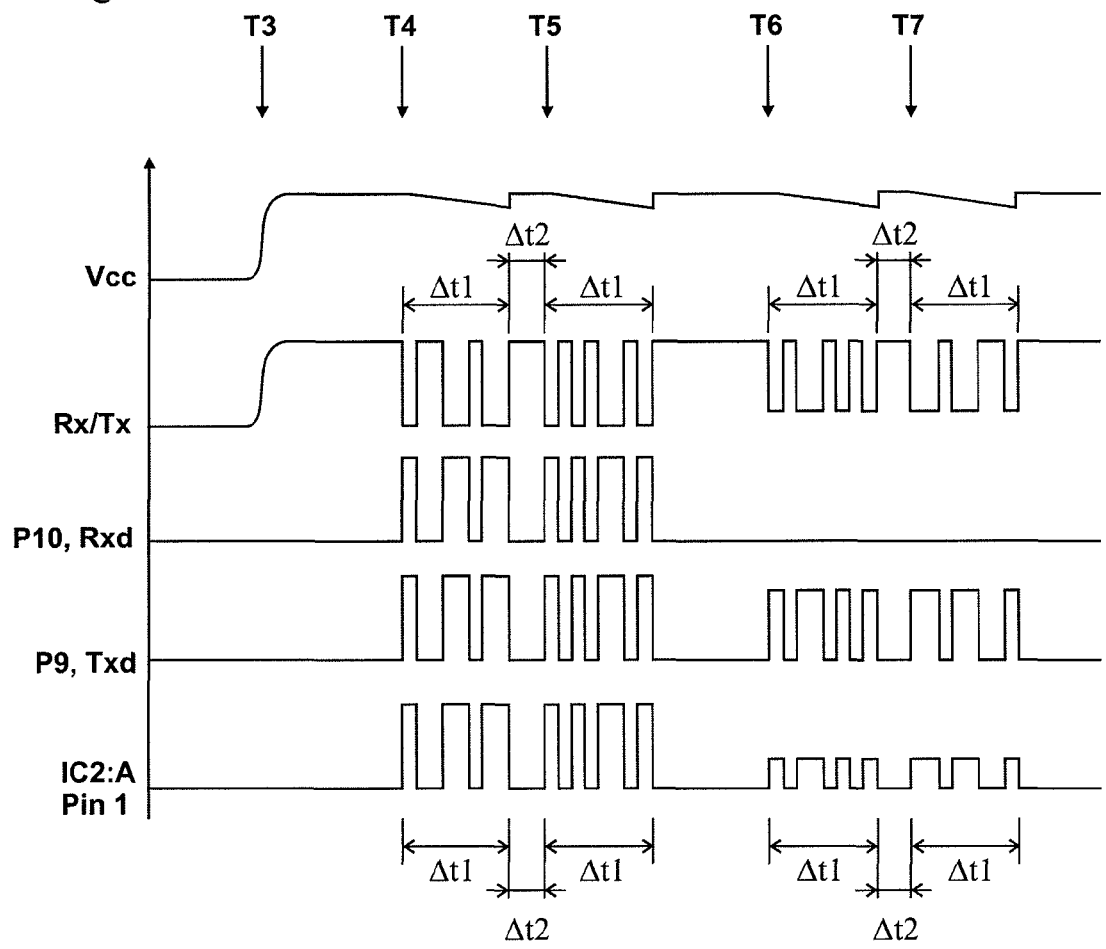

In the following, the invention will be described in greater detail with reference to the attached drawing figures, of which:

FIG. 1a shows an overview of a powersaw having an outer contact connected via a communication interface, to an external computer, FIG. 1b schematically shows an electronic control unit for control of an engine connected via an outer contact and a communication interface, to an external computer, FIG. 2 shows an example of the close-to-the-engine adaptation of a communication signal between a control circuit of the control system and an outer contact, FIG. 3 shows an example of a communication interface for an external computer, FIG. 4 is a diagram showing a normal start and stop, in respect of the supply voltage and the RX/TX signal, and FIG. 5 shows the starting of the control system via the communication interface, with the subsequent communication sequence to an external computer.

DETAILED DESCRIPTION

The present invention relates to a tool comprising an internal combustion engine 2 with an electronic ignition system without a battery, intended for manual starting, and in the following, an embodiment example will be described with reference to FIGS. 1a and 1b. A powersaw 1 is shown in the drawings, which powersaw comprises an electronic control circuit IC1, the object of which is to control ignition and fuel injection for the powersaw's 1 internal combustion engine 2. A stop button S1 is arranged on the casing/cover 6 of the powersaw 1, to be in connection 3 with the electronic control circuit IC1. When the powersaw is running and the stop button S1 is pressed down, a stop procedure is initiated in the electronic ignition system, by the electronic control circuit IC1, whereby the internal combustion engine 2 is stopped. An outer contact 5 is arranged in connection with the stop button S1. The outer contact 5 connects to the same connection 3 as S1 connects to the electronic control circuit IC1, and consequently, they share the connection 3. An external computer 4 can be connected to the outer contact 5, for communication between the computer 4 and the electronic control circuit IC1. A communication interface 7 is arranged between the computer 4 and the outer contact 5. Said communication interface 7 has the object of adapting the signal levels from a control unit A (see FIG. 2) in the powersaw 1, to a conventional RS-232 communication protocol that can be understood by the external computer.

FIG. 2 shows the connection 3 between the stop button S1 and the control circuit IC1, in greater detail (see also FIG. 1b). By the connection 3 shown in FIG. 1b, is meant the components as well as the electric cable that exist between the switch S1 and the control circuit IC1. The control unit A shown in FIG. 2 comprises parts of the connection 3 shown in FIG. 1b as well as of the control circuit IC1. The control circuit IC1 may for example be a processor, an ASIC circuit, or the corresponding, and it handles control signals for ignition and/or fuel control. The control circuit IC1 is provided with at least one port RX/TX, the status of the port being readable for detection of the stop button S1 and the port RX/TX also being arranged to transmit and receive serial data. Advantageously, the port RX/TX is of so called opendrain type, only enabling a lowering of the current. An inner contact 8 is arranged on the outside of the control unit A, by the inner connection points P1 and P2. An electric cable connects the inner contact 8 with the stop button S1. The first inner connection point P1 is connected to ground GND2, and the second inner connection point P2 connects to the first leg S1:C2 of the switch S1. The second leg S1:C1 of the switch connects to ground GND1. An outer contact 5 is arranged, preferably on the casing/cover 6 of a tool comprising an internal combustion engine 2 with an ignition system according to the invention. Via the outer connection points P3 and P4, the outer contact 5 connects to the stop button S1 and the inner contact 8, the first outer connection point P3 connecting to the first leg S1:C2 of the switch S1 and the second outer connection point P4 connecting to ground GND2.

A low-pass filter B, comprising a first resistance R2 and two capacitors C1, C2, is arranged between the inner contact 8 and the control circuit IC1. The low-pass filter B acts primarily as a protection against transients, and may be formed from other types of components, such as transient protecting diodes or VDR resistances. The third capacitor C3 is arranged between the Vcc entry IC1:Vcc of the control circuit and the control circuit's ground entry IC1:GND. The diode D1 is arranged such that it can charge the capacitor C3 via an outer voltage via P2. The second resistance R1 is arranged between supply voltage Vcc and the signal RX/TX. In a preferred embodiment example, the first resistance $R2=100\Omega$, the second resistance $R1=10\ k\Omega$, the first capacitor $C1=10\ nF$, the second capacitor $C2=10\ nF$, and the diode D1 is a conventional rectifier diode, such as 1N4148.

By the inner connection point P2, the inner contact 8 has four functions:

1. Entry for the stop button S1. During normal operation, i.e. when the engine is running, the engine 2 gives supply voltage Vcc for the control unit A. By the resistance R1 a weak pull-up current is then formed, which enables reading of the stop button S1 via the first inner connection point P2. Switching of the stop button S1 is read by the port RX/TX in the control circuit IC1, initiating a stop procedure in the control circuit IC1, whereby the control circuit IC1 transmits the appropriate control signals in order to stop the engine 2. Reading of the port RX/TX can be synchronized with possible transmission (see item 4) and reception (see item 3) of data during operation, without interfering with the function of the stop button S1. FIG. 4 shows how the supply voltage Vcc, in connection with a normal start of the engine at a first point of time T1, increases to a nominal value, and how the signal at the port RX/TX reaches a logic zero (the transmission is inverted). At the point of time T1, the stop button S1 is activated and the signal at the port RX/TX reaches zero. When the control circuit IC1 has detected this condition, it initiates the stop procedure.

2. Entry for external supply. When an external supply voltage is connected via the first inner/outer connection point P2/P3, the charging of the third capacitor C3 will take place via the first resistance R2 and the diode D1, and when the voltage of the first inner/outer connection point P2/P3 is equal to zero, the control circuit IC1 will receive power from the third capacitor C3. FIG. 5 shows how the supply fuel Vcc is applied at a third point of time T3, whereby the signal at the port RX/TX initially will be high through the first resistance R2.

3. Entry for incoming data from an external computer 4, via a communication interface 7 (se also FIGS. 1a, 1b, 3). The communication interface 7 can connect with the control unit A via the inner contact 8 or the outer contact 5, by connecting the communication port P8 of the communication interface 7 to the first outer/inner connection point P3/P2 and connecting the signal ground port P6 of the communication interface 7 to the other outer/inner connection point P4/P1. The voltage level of the port RX/TX constitutes an input signal for the serial interface integrated in the control circuit IC1. The transmission is inverted, i.e. normally there is a high voltage level on the RX/TX signal. The transmission is started by sending the logic numeral one by briefly lowering the voltage at P2/P3 to zero, whereby this pulse is detected by the port RX/TX through the low-pass filter B. Thereafter, a series preferably follows of the numerals one and zero of a predetermined length, preferably one byte. While the voltage at P2/P3 is zero, the control circuit IC I will receive power from the third capacitor C3. In other words, the transmission protocol used must limit the time for this condition such that the supply voltage Vcc does not fall below a critical level leading to the control unit IC1 being inappropriately affected. Here, there is also a compromise between a desired suppression of incoming voltage transients from the first inner/outer connection point P2/P3, and the transmission speed. The time Δt1 (see FIG. 5) indicates the time it takes to send a block of numerals one and zero, and depends on how much time that is set off for each numeral one and zero, and how many numerals one and zero that are sent in each block. The time Δt2 (see FIG. 5) denotes a minimum time between each block.

FIG. 5 shows, at the points of time T4 and T5, respectively, how a sign is sent from an external computer 4, to the control circuit IC1, via the communication interface 7 and the connection 3 (see also FIGS. 1a, 1b, 3). The diagram also shows how the communication interface 7 echoes signs. I.e. each sign sent by the external computer 4, incoming via the receiving pin P10, RXD, will be echoed back to the computer via the transmitting pin P9, TXD, and will also be sent to the port RX/TX of the control circuit IC1 (see FIG. 2). The outlet of the operation amplifier IC2:A pin 1 represents the measurement of current that takes place in the communication interface 7, via the third resistance R3 and the first operation amplifier IC2:A.

4. Outlet for data sent from the control unit A to an external computer 4, via a communication interface 7 (se also FIGS. 1a, 1b, 3). Serial data is sent by activation of an open drain outlet on port RX/TX in the control circuit IC1. This condition is detected by the communication interface 7, by detection of the increased consumption of current by the port RX/TX running low and the current limiting resistance R2. In the same way as in receiving data (see item 3), the control circuit IC1 sends a predetermined amount of numerals one and zero, preferably of one byte.

FIG. 5 shows at the points of time T6 and T7, respectively, how activation of transmission from the port RX/TX of the control unit IC1, results in an increased consumption of current, by measurement at the outlet of the operation amplifier IC2:A pin 1. This increased consumption of current is detected by the comparator connection, the second operation amplifier IC2:B, and is sent via the transmitting pin P9, TXD, to the external computer 4.

FIG. 3 shows an example of how to achieve a communication interface 7 for adaptation of the signal levels from the control unit A (see FIG. 2) for conventional RS-232. Thereby, the external computer 4 and the communication interface 7 may use the RS-232 standard for communication them between. Since it can be expected that only a few users, such as retailers for equipment containing small internal combustion engines, will need this unit, the requirement of low costs are not the same. The communication interface 7 is connected to an external voltage source that supplies the voltage V+ via the contacts P12 and P13. The communication interface contact 9 is connected to the outer contact 5 (see FIG. 2), by connecting the communication port P8 to the first inner/outer connection point P2/P3, and by connecting the signal ground port P6 to the second inner/outer connection point P1/P4. The communication port P8 has a pull-up resistance, the third resistance R3 that guarantees that the control unit A receives a supply voltage. When serial data is sent from an external computer 4, via the receiving pin P10, a passing takes place of the level shifter IC3, which is a level shifter between RS-232 levels, and for logical levels suitable for the control unit IC1, the transistor Q1 is activated, which short-circuits the communication port P8 to ground (P6). At the communication port P8, the voltage will accordingly alternate between close to zero when the transistor is active, and close to the voltage V+ when the transistor Q1 is inactive. During the inactive time of the transistor Q1, the reservoir capacitor of the control unit IC1, the third capacitor C3, will accordingly be charged. The transistor Q1 is preferably a Digital FET transistor.

When serial data is sent from the control unit IC1 to an external computer 4, a low level, i.e. a voltage of near zero, of the port RX/TX of the control unit IC1, will lead to a sudden increase in consumption of current, measured over the third resistance R3, via the fourth, seventh, fifth and sixth resistance R4, R7, R5, R6 and the first operation amplifier IC2:A that here forms a current amplifier. This analog current signal on the port 1 of the first operation amplifier IC:2A continues to an AC-connected discriminator formed from the eighth, ninth and tenth resistance R8, R9, RIO, the fourth capacitor C5 and the second operation amplifier IC2:B, here used as a comparator. The AC-connection given by the low-pass filter R8, C5 has the object of increasing the insensitivity for absolute consumption of current in the control unit IC1. The digitalized signal from the outlet of the second operation amplifier IC2:B port 7 will then pass the level shifting IC3 for conversion to RS-232 signal levels, to continue via the transmitting pin P9 to the external computer 4.

When connecting the communication interface 7 (FIG. 3), only two connectors are connected between the communication interface 7 and the control unit A (FIG. 2). One of them connects the chassis ground GND2 of the control unit via the second connection point P4/P1 to signal ground on the communication interface 7, via the signal ground port P6. The other is the communication signal between the first outer/inner connection point P3/P2 of the control unit A and the communication port P8 on the communication interface 7.

The invention is not limited to that described above, but may be varied within the scope of the claims. It is realized that besides being an external unit that is inserted between an external service computer and the tool, as described above, the communication interface 7 also can be integrated in the tool or in the computer. This is to say that the data communications from the tool can either be adapted to a suitable standard, or the external computer can learn to communicate with the control unit in the tool, in the latter's language. It is also realized that the precise design of the RX/TX port on IC1 can be varied, for example by the RX and TX signals not sharing the same physical port on IC1. It is not necessary for the stop button and the outer contact connected to the stop button to be situated at the same position on the tool's casing, but they may be situated at a distance from each other, connected by electrical cables. It is furthermore realized that the invention is not limited to powersaws, but any machine with an outer stop button connected to a control unit for an internal combustion engine of the type that lacks a starter battery. Also, it is realized that the communication protocol used by the control unit, can be suitably adapted. For example, it is conceivable to send more than 8 bits at a time, or less, depending on the embodiment. It is also conceivable that a battery that is not used as a starter battery is connected to the control unit, to supply power to the control unit. It is also clear that by external computer is meant equipment with the ability of communicating via data communications, meaning accordingly that it may be some type of electronic equipment adapted for such communication, accordingly not being limited to a conventional computer with a processor, motherboard and hard disk.

The invention claimed is:

1. A tool comprising:
a manually started an internal combustion engine free of a starter battery; an electronic control circuit to control the internal combustion engine; a stop button to stop said internal combustion engine; and a connection being arranged between the stop button and said electronic control circuit, wherein said connection between the stop button and the control circuit is arranged to be used for data communications between the control circuit and an external computer, and wherein the electronic control circuit comprises at least one serial port constructed to read switching of the stop button, and the at least one serial port is synchronized with transmission or reception of the data during use.

2. A tool according to claim 1, wherein said connection between the stop button and the control circuit is arranged to be used for external voltage supply to said electronic control circuit.

3. A tool according to claim 1, wherein said connection between the stop button and the control circuit is arranged to be used for other electronic components connected to said connection.

4. A tool according to claim 2, wherein a capacitor is charged by said external voltage supply, and that said capacitor supplies power to the electronic control circuit in the absence of external voltage supply via the connection or voltage supply from the engine.

5. A tool according to claim 1, wherein an outer contact, connected to said connection, is arranged at a casing of said tool.

6. A tool according to claim 1, wherein said connection comprises a low-pass filter arranged between the electronic control circuit and the stop button.

7. A tool according to claim 1, wherein said connection comprises a one-wire bus for two-way data communications.

8. A tool according to claim 7, wherein a communication interface is arranged between said connection and the external computer.

9. A tool according to claim 8, wherein said communication interface converts a one-wire communication from the tool to a conventional interface.

10. A tool according to claim 9, wherein the conventional interface comprises a RS-232 interface.

11. A tool according to claim 8, wherein the communication interface is in the form of a separate unit.

12. A method of communicating data from a tool, said tool comprising:
a manually started an internal combustion engine free of a starter battery; an electronic control circuit for controlling the internal combustion engine; a stop button for stopping the internal combustion engine, and a connection between the electronic control circuit and the stop button, wherein the electronic control circuit comprises at least one serial port constructed to read switching of the stop button, the method comprising:
communicating data between the electronic control circuit and an external computer and using the serial port to read switching of the stop button.

13. A method according to claim 12, further comprising using the connection between the stop button and the electronic control circuit to supply current to the electronic control circuit and to other components connected to said connection.

14. A method according to claim 12, wherein the data communications take place from the external computer to the electronic control circuit.

15. A method according to claim 12, wherein the data communications take place from the control circuit to the external computer.

16. A method according to claim 12, wherein the data communications take place serially.

17. A method according to claim 12, further comprising manually starting the internal combustion motor.

* * * * *